June 2, 1953  G. B. ELLIS  2,640,863
DEFERRED ACTION TYPE BATTERY
Filed April 5, 1950

INVENTOR.
GRENVILLE B. ELLIS
BY
*Harry M. Saragovitz*
Attorney

Patented June 2, 1953

2,640,863

UNITED STATES PATENT OFFICE 2,640,863

DEFERRED ACTION TYPE BATTERY

Grenville B. Ellis, Red Bank, N. J., assignor to the United States of America as represented by the Secretary of the Army Application April 5, 1950, Serial No. 154,121

1 Claim. (Cl. 136—90)

(Granted under Title 35, U. S. Code (1952), sec. 266)

The invention described herein may be manufactured and used by or for the Government for governmental purposes, without the payment of any royalty thereon.

This invention relates to multiple cell, deferred action type, meterological batteries (so-called "one-shot" batteries) adapted for quick activation by "dunking" into a liquid electrolyte, and more particularly to such batteries utilizing the electro-chemical system zinc-sulphuric acid-lead peroxide.

Early meteorological radio-sonde transmitters were powered with Leclanche type dry batteries which, although easily put into operation, had poor shelf life, poor low temperature and poor high discharge characteristics. The advent of high altitude flights made the power requirements for radio-sonde transmitters and other special purpose applications more stringent; higher voltage batteries were required to supply higher currents for longer periods of time even at very low temperatures. Leclanche batteries could no longer be used and were replaced by lead-sulphuric acid-lead peroxide batteries of the deferred action type. The capacity of these batteries per unit of weight and volume, however, was still too low and they also presented difficulties under field service conditions insofar as activation with the liquid electrolyte was concerned. Further improvement and reduction in weight were achieved by utilizing the electrochemical system magnesium-water-silver peroxide but the cost of such batteries was considerable, particularly in view of the fact that batteries of the "one-shot" type are either lost or discarded after a single use.

It is an object of this invention to provide low cost, lightweight meteorological "one-shot" batteries with superior low temperature and high rate discharge characteristics (high capacity per unit of weight and volume).

It is a further object to provide deferred type batteries which require no dry charging and no special packaging and are easily activated under field conditions within a matter of minutes.

Other objects of the invention will be apparent from the following description and accompanying drawing taken in connection with the appended claim.

Figure 1:
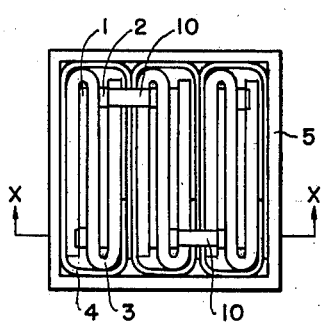
Fig. 1 is a top view of a battery according to the invention, consisting of three cells.
Figure 2:
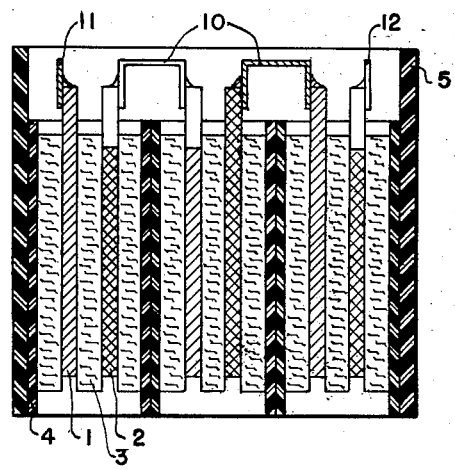
Fig. 2 is an enlarged sectional view, taken along the line X—X of Fig. 1.

Referring to Figs. 1 and 2, each of the three cells comprises two thin flat plate electrodes; namely, a positive zinc anode 1 and a negative lead peroxide cathode 2. The cathode 2 may be made in well known manner by pasting or plating lead peroxide in a blanked grid consisting of copper, nickel or other suitable material. The grid is preferably perforated as known in the art for better adhesion of the lead peroxide. A spacer 3 of bibulous sheet material surrounds both electrodes laterally, thus separating the electrodes 1, 2 from each other and from the insulating sheet material which constitutes the hull 4 of the cell. This hull 4 holds the elements of the electrode-spacer structure laterally together under pressure contact but leaves top and bottom of the electrode-spacer structure open. The bibulous spacer 3 may consist of paper, wood-pulp, microporous rubber, glasswool or other liquid retaining materials, inert to the action of the acid electrolyte. The thickness of the spacer 3 is designed to soak up enough electrolyte (not shown) to allow complete utilization of the active material of the electrodes 1, 2.

The cell hull 4 consists of suitable plastic sheet material such as polystyrene, various poly-vinyl resins, synthetic rubber or other elastomers, Scotch tape, etc. The hull 4 may be made by wrapping the plastic sheet material around the electrode-spacer structure or by using a preformed hull 4 of suitable form and dimensions in which the electrode-spacer structure is to be inserted. In both cases the cells thus constructed will possess certain resilience particularly with regard to their thickness in a transverse direction; therefore, a plurality of such cells in juxtaposition can be easily and tightly packaged, for instance, in an open frame structure or battery frame 5 which surrounds the cells laterally and is of such inner dimensions that the desired number of cells are closely and immovably held together. The battery frame 5 may consist of any of the materials used for the cell hull 4, as enumerated above. As in the case of the hull 4, the frame 5 may be made either by wrapping plastic sheet material around the desired number of juxtaposed cells or by inserting the desired number of juxtaposed cells into a pre-formed battery frame 5 of suitable dimensions. To avoid undesired conductive paths or electric leakage between the cells, each cell hull 4 extends longitudinally beyond the exposed lower edges of the electrode-spacer structure of each cell (as shown in Fig. 2). The bottom edges of the battery frame 5 may be flush with the bottom edges of the hull 4. Metal tabs 10 electrically connect successive cells in conventional manner; the positive electrode of one end cell and the negative electrode of the other end cell each being provided respectively with a positive terminal 11 and a negative terminal 12.

To activate the above-described battery it is immersed into sulphuric acid electrolyte for about one to three minutes depending on the size of the battery and the nature of the bibulous material of the spacers 3. After this time, the battery is withdrawn from the liquid electrolyte, shaken to remove excess electrolyte and is then ready for use. The electric potential of each cell is about 2.5 volts. The specific gravity of the sulphuric acid electrolyte is preferably between about 1.28 and 1.360. Salts, e. g., mercuric chloride may be added to this electrolyte. It is also possible to impregnate the material of the bibulous spacers 3 with acid salts, e. g., ammonium sulphate or other compounds which send sulphate ions into solution. A battery with such impregnated spacer material can be activated by immersion into water.

Figure 3:
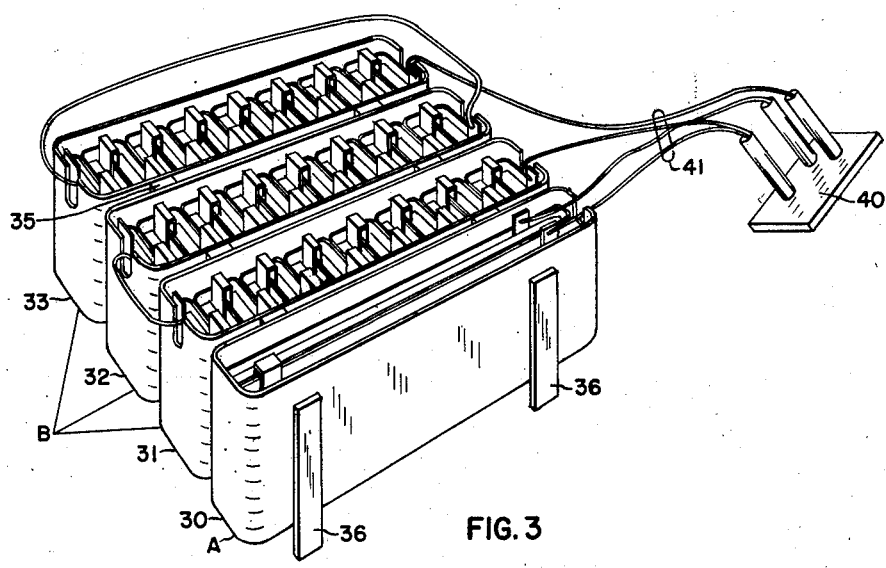
Fig. 3 is a perspective view of a complete "A" and "B" battery pack for powering meteorological radio-sonde transmitters, made up from cells and batteries according to the invention.

Fig. 3 shows a complete "A" and "B" battery pack as conventionally used for powering meteorological radio-sonde transmitters. It consists in known manner of an "A" battery of low voltage and high power for heating the electron tube filament and a "B" battery of high voltage and low power for applying the operating potential to the plates of the electron tubes.

The "A" battery consists of one battery frame 30 containing two cells connected in series having relatively large electrodes. The "B" battery consists of three battery frames 31, 32 and 33 each containing a number of small cell units all of them connected in series. The four battery frames 30, 31, 32 and 33 may conveniently be fastened together by small fastening strips 35, preferably of plastic material, fastening together the sides of adjacent battery frames by the use of a plastic adhesive or by heat sealing. Supporting strips 36 which extend below the frames serve as legs to hold the battery in a raised position.

Wires 41 connect in conventional manner the terminals of the "A" and "B" batteries with a plug 40. Such a battery pack can very conveniently be activated by holding the plug 40 in one hand, submerging the batteries into the liquid electrolyte for a few minutes, withdrawing it and shaking off the excess electrolyte. The battery is then ready for use.

While I have described the novel structure of the deferred action type battery according to my invention in connection with the preferred electro-chemical system zinc-sulphuric acid-lead peroxide, I do not wish to be limited thereto since it is evident that considerable advantages are obtainable by using my new structure for other electro-chemical systems such as lead-sulphuric acid-lead peroxide, magnesium-water-cuprous chloride, or the like.

I claim:

A multiple cell, deferred action type, extreme lightweight battery adapted for quick activation by "dunking" into a liquid electrolyte comprising a plurality of juxtaposed electrically connected cells, said cells each comprising as internal elements a flat, thin plate, zinc electrode and a flat, thin plate, lead peroxide electrode, said electrodes each being laterally surrounded by spacers of bibulous material, said internal elements of each cell being held together resiliently under pressure contact solely by means of a first resilient hull of insulating plastic sheet material laterally surrounding said internal elements, said first hull extending beyond the exposed lower edges of said internal elements while leaving top and bottom of the cell open, said plurality of juxtaposed cells possessing resilience with regard to their thickness in a transverse direction and being held under pressure contact solely by means of one second resilient outer hull of insulating plastic sheet material laterally surrounding said plurality of resilient cells while leaving top and bottom of said cells open for the entrance of liquid electrolyte.

GRENVILLE B. ELLIS.

References Cited in the file of this patent

UNITED STATES PATENTS

| Number | Name | Date |
|---|---|---|
| 637,071 | Blumenberg | Nov. 14, 1899 |
| 880,703 | Wheeler | Mar. 3, 1908 |
| 1,401,671 | Chubb | Dec. 27, 1921 |
| 1,605,620 | Schulte | Nov. 2, 1926 |
| 2,307,769 | Deibel | Jan. 12, 1943 |
| 2,343,970 | Galloway | Mar. 14, 1944 |
| 2,462,880 | Mandel | Mar. 1, 1949 |
| 2,491,640 | Blake et al. | Dec. 20, 1949 |
| 2,529,511 | Murphy | Nov. 14, 1950 |
| 2,564,495 | Mullen | Aug. 14, 1951 |